E. H. TAYLOR, DEC'D.
G. A. TAYLOR, ADMINISTRATOR.
CUTTING AND SCORING MACHINE.
APPLICATION FILED DEC. 10, 1915.

1,255,810.

Patented Feb. 5, 1918.
7 SHEETS—SHEET 1.

INVENTOR:
Eugene H. Taylor
by Macleod, Calver, Copeland & Dike
Attys.

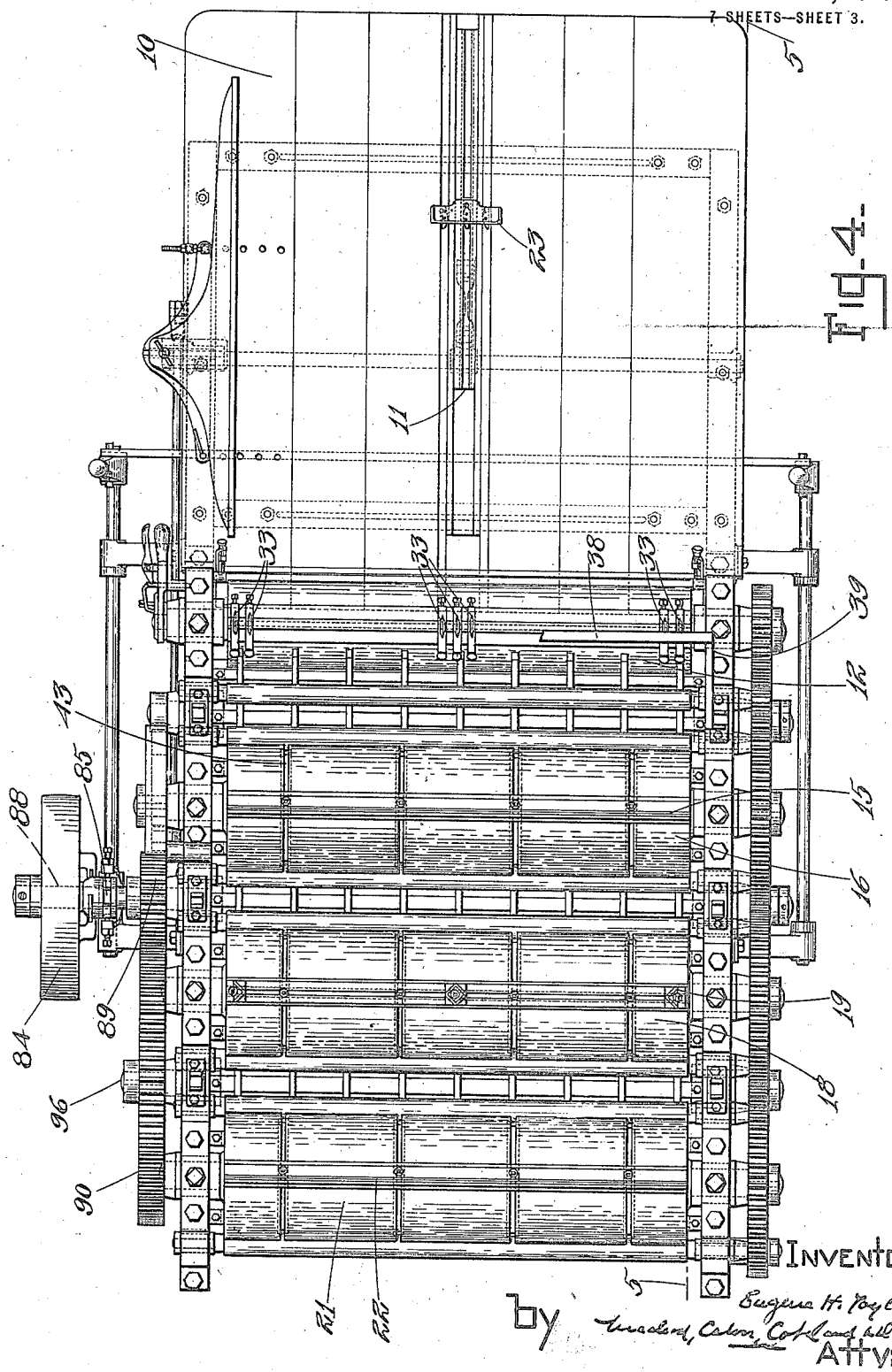

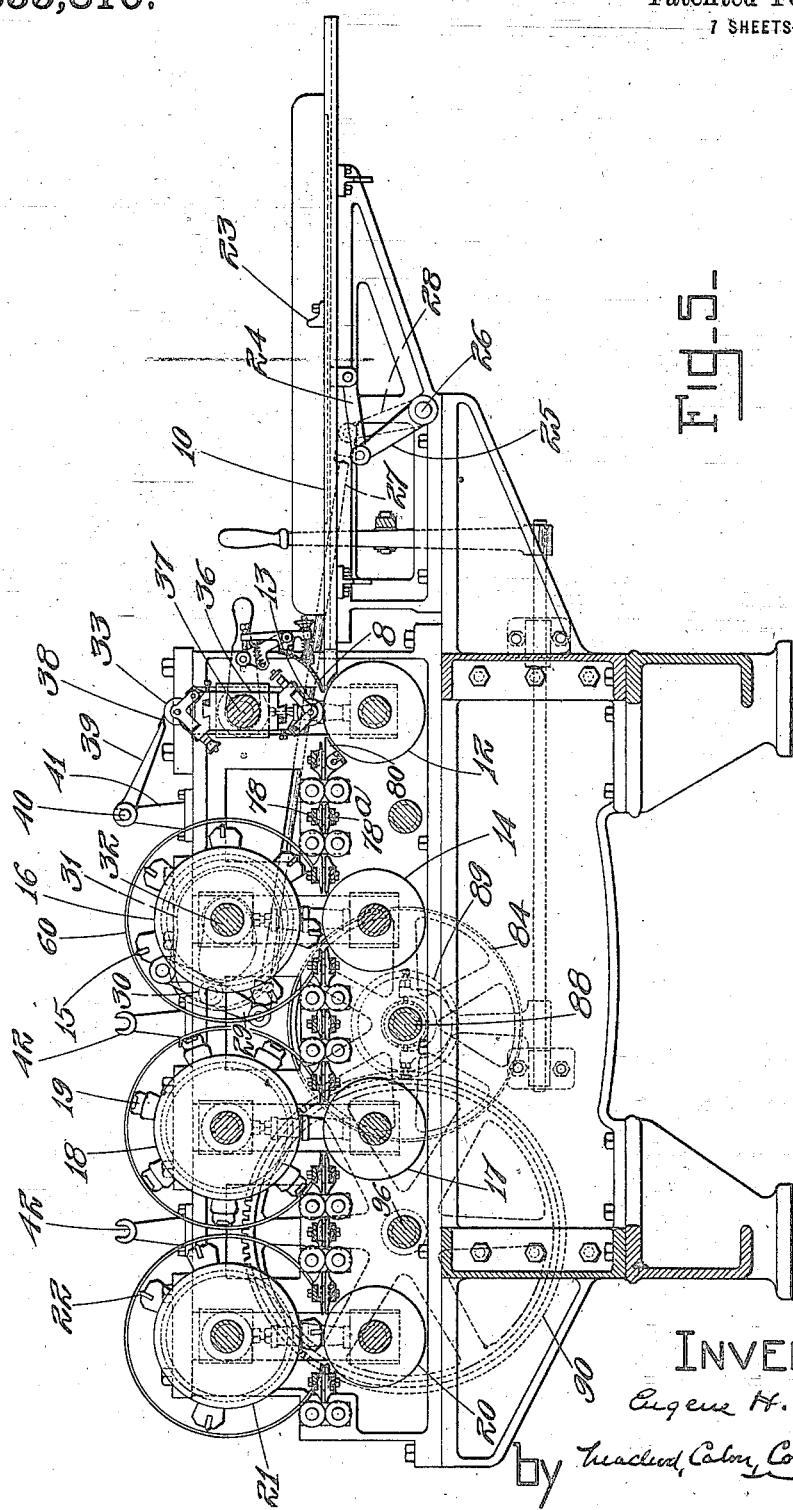

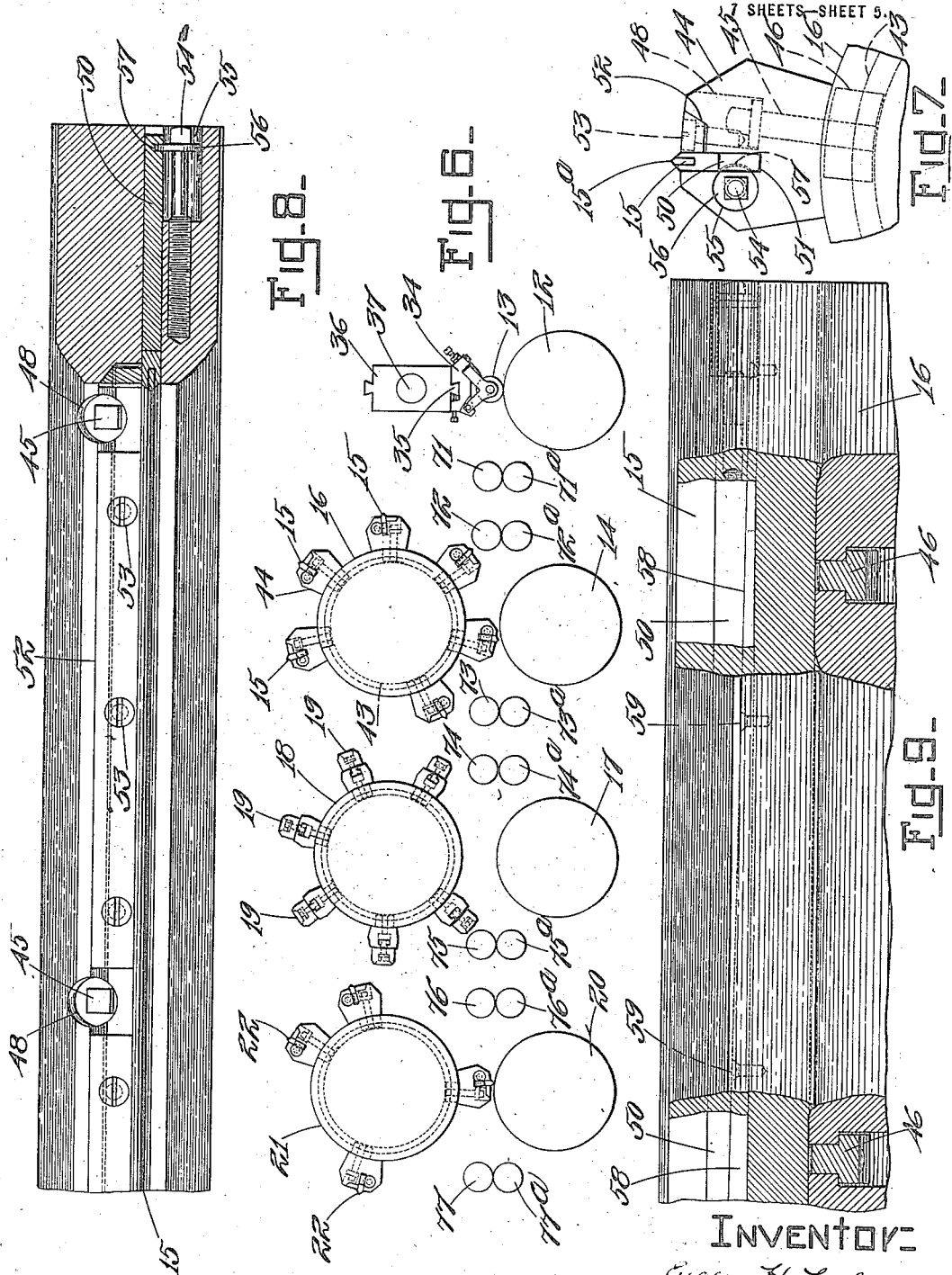

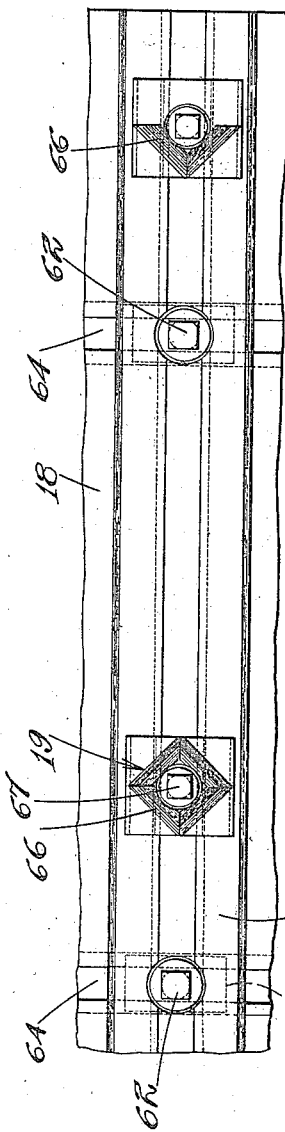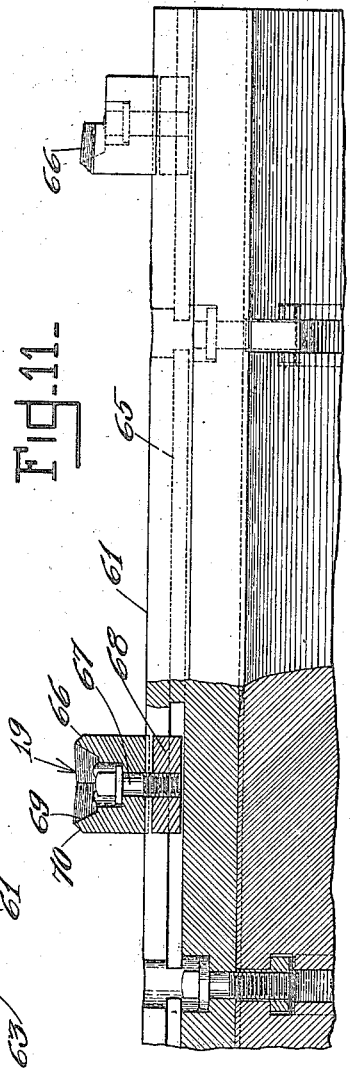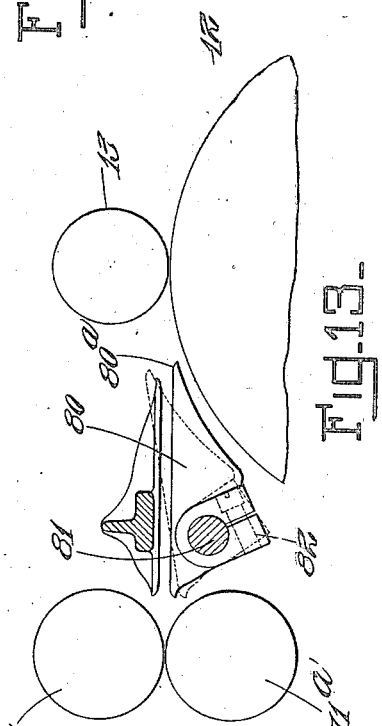

UNITED STATES PATENT OFFICE.

EUGENE H. TAYLOR, OF HYDE PARK, MASSACHUSETTS; GEORGE A. TAYLOR ADMINISTRATOR OF SAID EUGENE H. TAYLOR, DECEASED.

CUTTING AND SCORING MACHINE.

1,255,810.          Specification of Letters Patent.        Patented Feb. 5, 1918.

Application filed December 10, 1915. Serial No. 66,182.

*To all whom it may concern:*

Be it known that I, EUGENE H. TAYLOR, a citizen of the United States, residing at Hyde Park, county of Suffolk, State of Massachusetts, have invented a certain new and useful Improvement in Cutting and Scoring Machines, of which the following is a specification, reference being had therein to the accompanying drawings.

My invention has for its object a blanking machine for forming paper box blanks from large sheets of card or straw board, such as is ordinarily used in the manufacture of paper boxes or parts thereof, such for instance as the body or cover. The machine embodying my invention is adapted to feed large sheets of card board, trim them to the required size, cut them into sections of the size of the required box blank, score the blanks along the folding lines, and cut out at the proper points any necessary portions for the formation of tucks and the like.

The particular object of my invention is a machine which will perform this entire series of operations automatically and at the highest possible speed while at the same time having a wide range of adjustability so that blanks of different shapes and sizes may be produced on the same machine. For convenience of illustration, I have shown in the drawings accompanying this specification two blanks adapted to be formed by the machine.

The invention will be fully understood from the following description when taken in connection with the accompanying drawings and the novel features thereof are pointed out and clearly defined in the claims at the close of this specification.

Referring to the drawings, Figure 1, is a plan view of a sheet of card board showing the condition of the same after having passed through the machine, said sheet being formed into blanks for the manufacture of six folding boxes.

Fig. 4 is a top plan view of said machine shown in Fig. 3.

Fig. 5 is a section on line 5—5 of Fig. 4.

Fig. 6 is a diagram showing the arrangement of the creasers, corner cutters, slitters and bed rolls.

Fig. 7 is an end elevation of a creaser blade and supporting bar.

Fig. 8 is a plan view of the parts shown in Fig. 7 partly broken away to show the arrangement of the adjusting mechanism.

Fig. 9 is a modification in side elevation and partly in section of the parts shown in Fig. 7.

Fig. 10 is an end elevation of a corner cutter and supporting bar.

Fig. 11 is a plan view of the parts shown in Fig. 10.

Fig. 12 is a side elevation partly in section of the parts shown in Fig. 10.

Fig. 13 is a detail partly in section of the waste ejectors.

Figure 1:
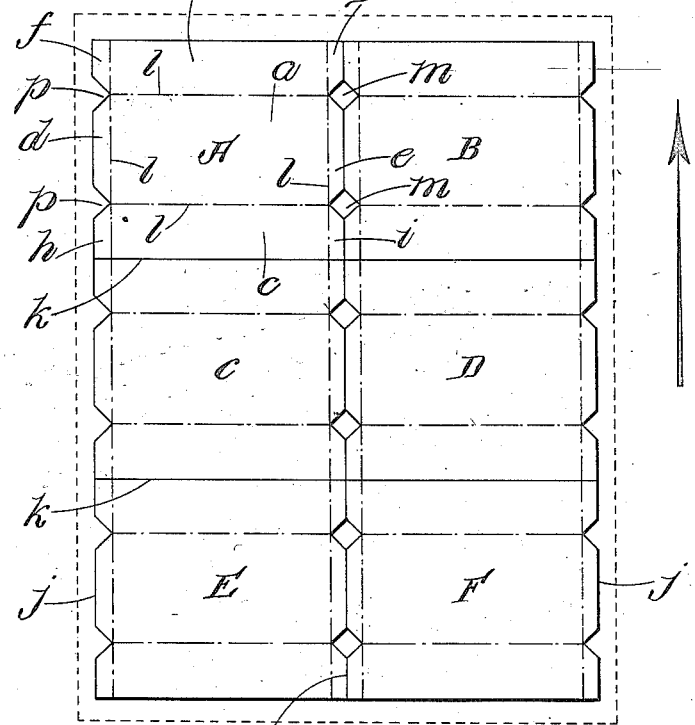
Figure 3:
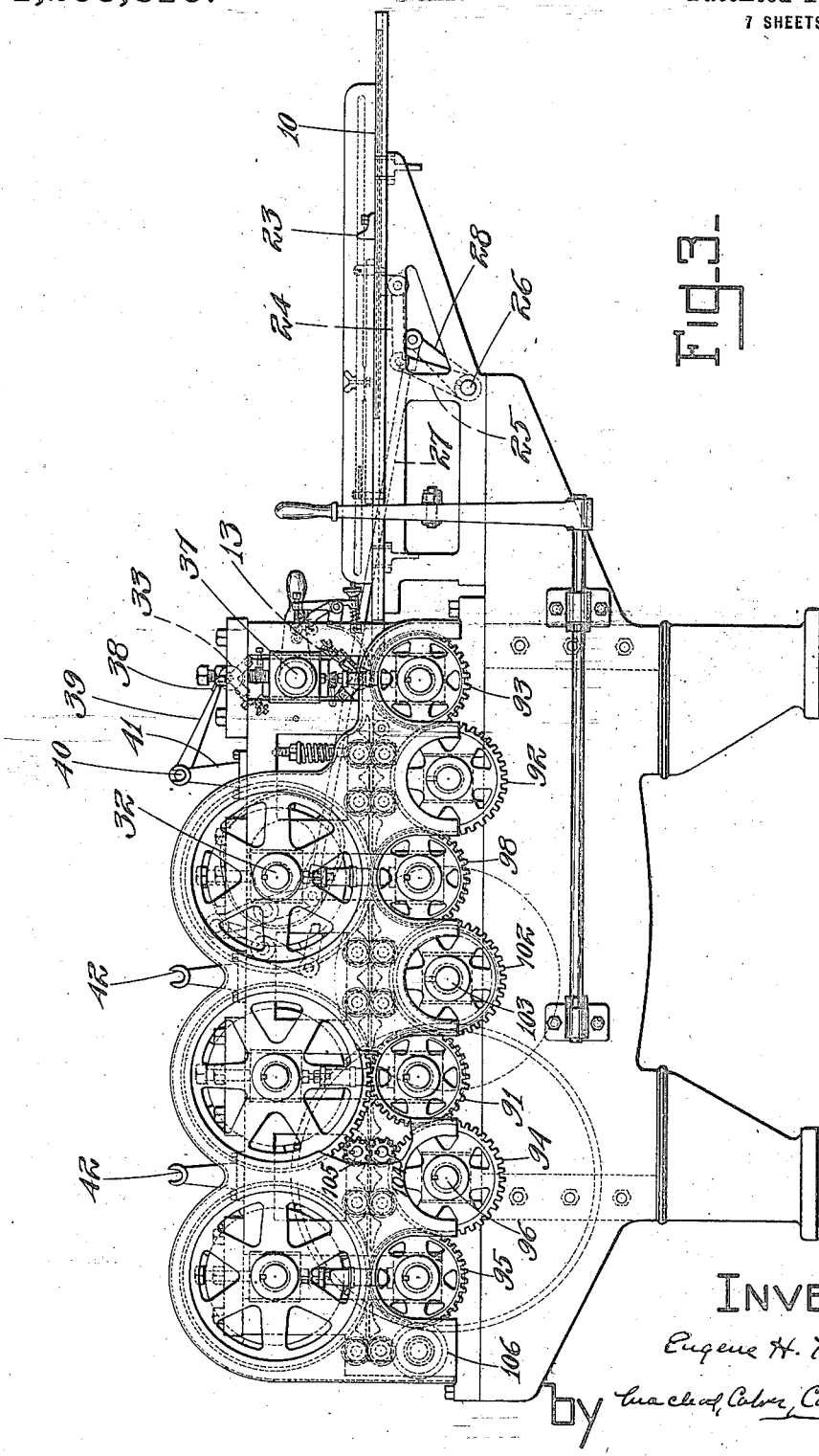
Fig. 3 is a side elevation of a machine embodying my invention.

In the drawings, in Fig. 1, there is shown a sheet of card board after it has been through the machine, the original area of the sheet being indicated by dotted lines. This sheet is made into six blanks for folding boxes, said blanks being lettered A, B, C, D, E, F. Each blank consists of a body portion $a$, two side portions $b$ and $c$; two ends $d$ and $e$; and four end flaps $f$, $g$, $h$ and $i$. The blank goes through the machine in the direction of the arrow in Fig. 1. Accordingly it is necessary to trim off the longitudinal edges $j$, cut or deep score the lines $k$, between the blanks; score lightly or crease the folding lines $l$, and cut out the areas $m$, between the blanks, and the corresponding areas $p$ at the ends of the sheet.

Figure 2:
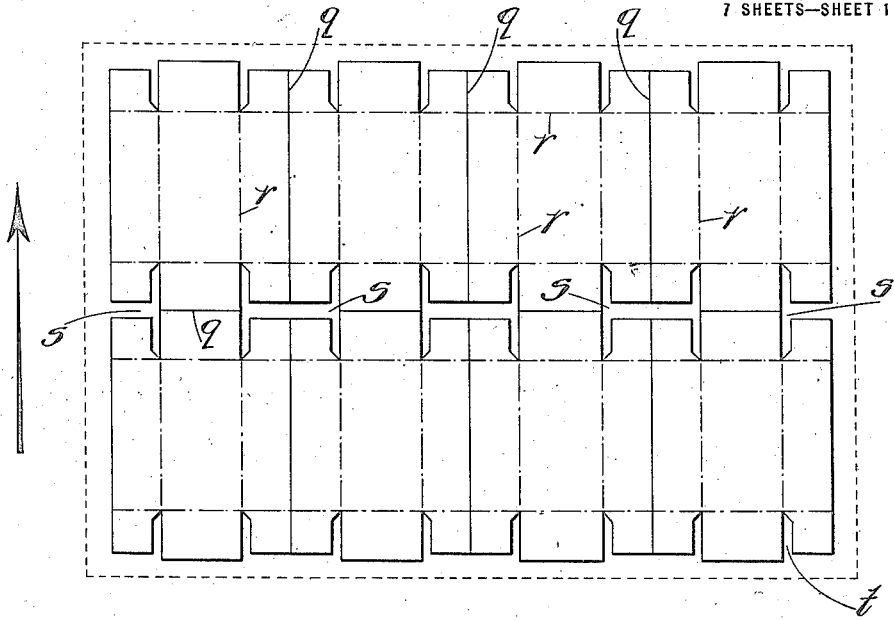
Fig. 2 is a similar view showing a sheet of card board made into blanks for the bodies of eight glued boxes adapted to be finished in a box ending machine embodying the invention.

In Fig. 2 is shown a sheet which is formed into eight blanks of another shape. In this case it is likewise necessary to trim the blank; to cut or deep score the lines $q$ between the blanks, to score lightly the folding lines r and to cut out the areas s between the blanks and the corresponding areas t at the ends of the sheet. This blank goes through the machine in the direction indicated by the arrow in Fig. 2.

The general arrangement of the machine is as follows: The material is laid on the table 10 and is fed by a feeder 11 one sheet at a time through four sets of working instrumentalities successively. The nature and sequence of these working instrumentalities is most easily understood by reference to Fig. 6. The first set of working instrumentalities forms all the longitudinal lines, including trimming the lengthwise edges, deep scoring between the blanks, and scoring lightly the folding lines. It consists of a bed roll 12, and rotary scoring knives 13. The sheet then passes through the second set of instrumentalities which score lightly the transverse folding lines. These instrumentalities consist of a bed roll 14 and a series of scoring blades 15 supported lengthwise of a roll 16. The sheet then passes through the third set of instrumentalities which cut out the corners. This set of instrumentalities consists of a bed roll 17 and a roll 18 having thereon a series of corner cutters 19. Thereafter, the blank passes through the last set of instrumentalities which cut or deep score the transverse lines between the blanks. These consist of a bed roll 20 and a roll 21 on which are mounted a series of transverse knife blades 22. By doing the transverse light scoring on one set of rolls and the transverse deep scoring or cutting on a later set, the blanks are kept together in sheet form until the work of the machine is completed. The feeder comprises a slide 11 having a bracket 23 thereon which engages the rear edge of the sheet of card board. The feeder 11 is conveniently operated as follows: It is reciprocated by a link 24 connected to the upper end of one arm 25 of a rock shaft 26 carried in the frame of the machine. The rock shaft is oscillated by a link 27 connected to an arm 28 and at its other end connected to a cam lever 29 having thereon a cam roll 30 which travels in the cam groove of a cam 31 on the shaft 32. The train of gears by which the cam is revolved will be hereinafter described. The feeder pushes the front edges of the sheets of card board forward through a spring guide 8 until it is caught by the first pair of guide rolls which will be later fully described.

The front edge of the sheet then passes on top of the bed roll 12 being then underneath the longitudinal rotary scoring knives 13, see Figs. 5 and 6. These scoring wheels are carried in brackets 34 mounted on a dove tail rib 35 on a bar 36. This bar 36 is mounted on trunnions 37 so that it may be rotated through an angle 180° for the purpose of bringing the scoring knives 33 mounted on top of the bar into operative position. This arrangement makes it possible to keep this part of the machine constantly set up and ready for use on two sizes of blanks. It is old and well known in scoring machines and therefore will not be described in further detail.

The machine being set up to box blanks as shown in Fig. 1, the two outer scoring knives 13 are sharp and set with their edge in contact with the bed roll 12 and trim off the waste from the edges of the sheet. The middle scoring knife 13 is also intended to deep score or cut and is set the same as the outer knives but is preferably nicked in the well known manner so that the blanks will not separate as they pass through the machine. The remaining knives 13 are dull and are not set with their edges in contact with the surface of the bed roll and therefore crease or score the board lightly as it passes through the machine. For convenience in setting the knives, I provide a scale 38 on the top of the machine mounted on arms 39 having trunnions 40 which rest in brackets 41. This scale is graduated and rests upon the idle scoring knives on the top of the scoring knife bar 36. By this arrangement the scoring knives may be set with the greatest nicety and the work done quickly and without straining the eyes as has been frequently the case heretofore. Additional brackets 42, are provided in proper relation to the other scoring knives so that the same scale may be employed to set all the scoring knives.

As previously stated the transverse light scoring is done by scoring blades 15 mounted on the roll 16 and coöperating with the bed roll 14. The roll 16 is provided with a series of annular T-slots 43 (see Figs. 4, 6 and 7). Each blade 15 is mounted in a heavy bar 44 secured by bolts 45, the screw threaded ends of which engage nuts 46 located in said annular T-slots 43. The bars 44 rest on the surface of the roll 16 and being secured thereto at frequent intervals are perfectly rigid and true. The heads of the bolts 45 lie within counter bored holes 48 and are easily reached by means of the ordinary socket wrench. The scoring blade 15 is provided with a cutting edge 15$^a$ preferably made of high grade steel and secured thereto by welding or brazing or by a driving fit. The blade 15 is held in place in the bar 44 by means of a wedge shaped strip 52 lying in a correspondingly shaped groove in the bar 44. Screws 53 crowd the strip 52 downwardly and against the blade 15. The blade 15 is wedge shaped on its lower edge and rests upon a wedge 50 slidable longitudinally in the groove in the bar 44 in which the blade 15 and wedge 50 lie. In the process of manufacture the bottom surface 51 of the wedge 50 is ground so that when it is assembled with the machine it will be exactly parallel with the cutting edge 15ª of the blade with which it is to be used. In this way even scoring for the entire length of the scoring blade is obtained. At 54 is shown the adjusting screw by means of which the wedge 50 is moved longitudinally of the scoring blade bar to raise or lower the scoring blade 15 and so vary the depth of the score which is made in the work. The adjusting screw 54 lies in a counter bored hole 55 adjacent the slot in which the wedge 50 lies and is provided with a flange 56 which engages an arcuate slot 57 milled in the side of the wedge. It will, therefore, be seen that when the adjusting screw is turned it will move the wedge 50 in or out according to the direction of rotation.

In Fig. 9 there is shown a slight modification of the construction just described. In this case the under side of the blade 15 is parallel with the scoring edge and the inclined face of the wedge 50 is on the lower side and coöperates with a wedge shaped strip 58 secured by screws 59 to the bottom of the groove.

At 60 is shown a circular or angular scale secured to the frame of the machine at the ends of the roll 16. This scale assists the operator in setting the scoring blades in the correct position. It will be understood that the roll 16 will be provided with as many scoring blades 15 as there are transverse light scored lines to be formed in the blank.

At 18 is indicated the roll on which the corner cutters are mounted. To the periphery of this roll are secured bars 61 by means of bolts 62 engaging nuts 63 located in annular T-slots 64 in the periphery of the roll. Each of the bars 61 has formed therein a longitudinal T-slot 65. The corner cutting dies 66 are shaped according to the shape of the stock to be removed and are secured to the bars 61 by means of bolts 67 engaging nuts 68 in the said T-slots 65. It will thus be seen that the bars may be given any position desired about the periphery of the roll 16 by shifting them in the annular slot 64 and the corner cutters may be given any desired position longitudinally of the bars by shifting them in the slot 65.

The corner cutter blades are preferably formed in cross section with an inclined inner surface 69 and outer surface 70 converging to form the cutting edge. This construction prevents the corner cutter filling up with waste stock and interfering with the operation of the machine.

The roll 21 is provided with transverse blades 22 mounted on the roll and adjustable about it in the same manner as has already been described in connection with the roll 16.

At 71, 71ª, at 72, 72ª, 73, 73ª, 74, 74ª, 75, 75ª, 76, 76ª, and 77, 77ª, are shown pairs of guide rolls which support the stock during its passage through the machine, there being in the machine shown in the drawings two pairs of guide wheels between each set of working instrumentalities. Said guide rolls are positively driven as will be later described.

At 78 and 78ª are shown fixed guides which bridge the spaces between the guide rolls and between the guide rolls and the bed rolls so that the stock is supported positively throughout the entire length of the machine. The guide rolls have the same peripheral speed as the bed rolls so that all the parts of the blank are carried along at a uniform rate of speed.

At 80 is shown an ejector pivoted on a bar 81 and having its point 80ª adjusted by means of the set screw 82 so that the strips of waste removed from the outer edges of the blank by the trimming knives 13 will be prevented from passing through the machine.

The drive of the machine is as follows: On the shaft 88 is located the pulley wheel 84 connected with the gear 89 by means of a clutch 85. This gear 89 meshes with a large gear 90 mounted on a shaft 96 which runs through the machine and is below the line of guide rolls. The farther end of the shaft 96 carries a gear 94. The gear 94 meshes on one side of the gear 95 for the bed roll 20 and on the other side with the gear 91 for the bed roll 17. The gear 91 meshes with the idle gear 102 on a stud or short shaft 103. The idle gear 102 drives the gear 98 for the bed roll 14 and this gear meshes with an idle gear 92 which drives the gear 93 for the bed roll 12. The gears 95, 96, 91, 102, 98, 92 and 93 are all located on one side of the machine while the gears 89 and 90 are located on the opposite side of the machine. Each pair of guide rolls is geared together by small gears 104 and 105. The guide rolls 71, 72 are driven by the idle gear 92, the guide rolls 73 and 74 are driven by the gear 102 and the guide rolls 75 and 76 are driven by the gear 94. At 106 is shown a gear meshing with the gear 95 and itself driving the guide roll 77.

Figure 14:
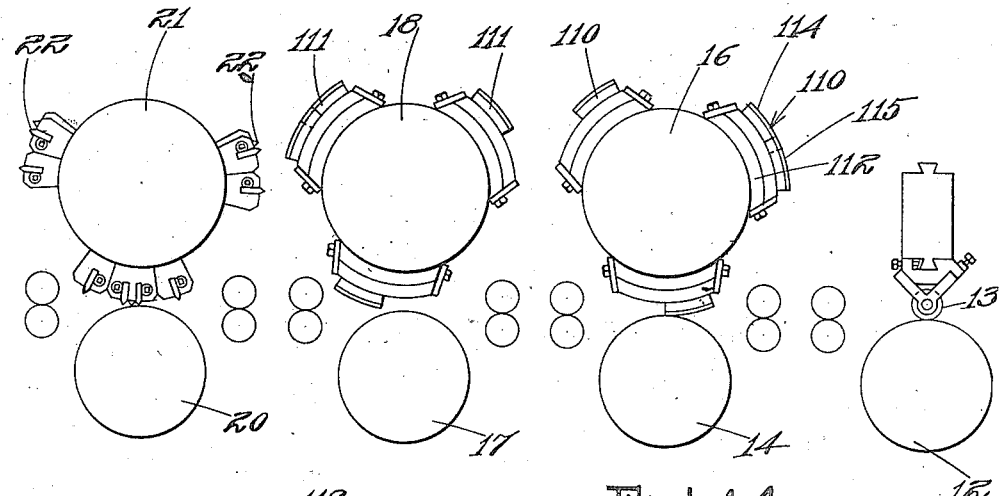
Fig. 14 is a diagram similar to Fig. 6 and showing the arrangement of parts for the production of a box blank like that shown in Fig. 2.
Figure 15:
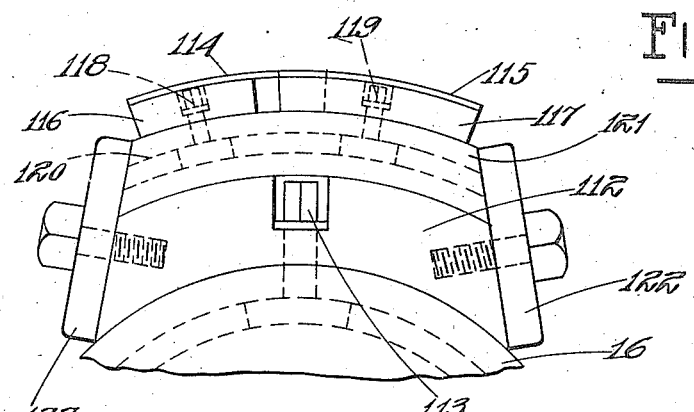
Fig. 15 is an end elevation of a pair of cutters used in the production of a blank like that shown in Fig. 2.
Figure 16:
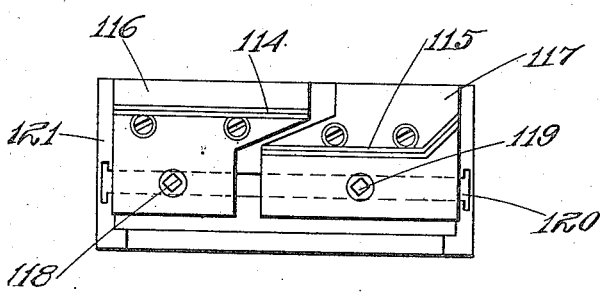
Fig. 16 is a plan view of the cutters shown in Fig. 15.

Referring now to Figs. 14, 15 and 16 there are shown instrumentalities for the completion of box blanks such as have been described in reference to Fig. 2. The first set of working instrumentalities forms all the transverse lines and is similar to that shown in Fig. 6 except that more rotary scoring knives are used and with a different spacing. In Fig. 14 I have indicated this set as consisting of the bed roll 12 and rotary scoring knives 13. The second set of instrumentalities consists of the bed roll 14 and the roll 16 having thereon a series of corner cutters 110 which coöperate with a second series of corner cutters 111 mounted on the roll 18 above the bed roll 17. The last set of instrumentalities is similar to the last set shown in Fig. 6 except for the number and spacing of the blades and consists of the bed roll 20 and roll 21 on which are mounted the knife blades 22 which cut or deep score the longitudinal lines. Figs. 15 and 16 show in detail the method of mounting the corner cutters 110 which consists of a bar 112 secured by bolts 113 to the roll 16, the blades 114 and 115 being mounted in blocks 116 and 117 which are capable of adjustment through screws 118 and 119 coöperating with slots 120 in the block 121 which is held by gibs 122 to the bar 112. The corner cutters 111 are mounted in the same manner and are similar except that the knives are transposed, the set 110 cutting one half of the corner of the blank while the set 111 cuts the remaining half.

What I claim is:

1. The scoring means for lines transverse of the line of movement of stock through the machine which comprises a roll provided with circumferential slots, movable bars secured in said slots and themselves slotted longitudinally, scoring blades in said slots, a wedge shaped strip in contact with the side of each scoring blade on one side and on the other side in contact with an inclined surface formed at the side of the slot, means to clamp the same in place, and a wedge in each of said slots and under the respective blades, said wedges being movable longitudinally in their slots to adjust the blades radially of the roll.

2. In a machine of the character described, the combination of a series of rotary scoring wheels, a roll having transverse light scoring blades on the surface thereof, a roll having corner cutters on the surface thereof, a roll having deep scoring blades on the surface thereof, a bed roll coöperating with each of said instrumentalities, said instrumentalities being arranged in the order named, and positive driving means for each of said instrumentalities except said rotary scoring wheels and for said bed rolls.

3. In a machine of the character described, the combination of a series of rotary scoring wheels, a roll having transverse light scoring blades on the surface thereof, a roll having corner cutters on the surface thereof, a roll having deep scoring blades on the surface thereof, a bed roll coöperating with each of said instrumentalities, said instrumentalities being arranged in the order named, pairs of guide wheels between each of said instrumentalities, and positive driving means for each of said instrumentalities, except said rotary scoring wheels, for said bed rolls, and for said guide wheels.

4. In a machine of the character described, a series of rolls, bed rolls coöperating with each of said rolls, each of the rolls of said series having annular T-slots, bars and transverse scoring blades, secured to the T-slots of some of said rolls, and bars and corner cutters secured to the T-slots of others of said rolls.

5. In a machine of the character described, the combination of a roll having annular T-slots formed therein, longitudinal bars secured to said T-slots, blocks slidable longitudinally of said bars, T-slots in said blocks, at right angles to the T-slots in the bars, and cutter knives secured to the T-slots in the said blocks.

6. In a machine of the character described, the combination of a roll having annular T-slots formed therein, longitudinal bars secured to said T-slots, blocks slidable longitudinally of said bars, T-slots in said blocks, at right angles to the T-slots in the bars, knife blocks secured to the T-slots in said blocks, and knives on said knife blocks.

In testimony whereof I affix my signature, in presence of two witnesses.

EUGENE H. TAYLOR.

Witnesses:
CAMERON MACLEOD,
ALICE H. MORRISON.